United States Patent Office 3,254,117
Patented May 31, 1966

---

3,254,117
CARBORANYLACETYLENES AND ACID, ALCOHOL AND HALIDE DERIVATIVES THEREOF
John A. Dupont and Marion F. Hawthorne, Huntsville, Ala., assignors to Rohm & Haas Company, Philadelphia, Pa., a corporation of Delaware
No Drawing. Filed Mar. 24, 1961, Ser. No. 98,262
7 Claims. (Cl. 260—526)

This invention concerns derivatives of carboranylacetylene which is formed by the reaction of decaborane adducts, $B_{10}H_{12} \cdot X_2$, and diacetylene. More particularly, it concerns impact stable high boron content compounds which have high energy characteristics which can be used as such in propellants or as intermediates in the preparation of polymerizable high energy monomers.

The field of boron chemistry, particularly the chemistry of the reactions of the higher boron hydrides, such as decaborane, is so new that the nomenclature for many of the compounds has not yet been definitely fixed. However, chemists working in this new field have definitely agreed that the reaction product formed by the interaction of a decaborane adduct such as bis(acetonitrile)decaborane, $B_{10}H_{12} \cdot 2CH_3CN$, and acetylene produces carborane with the formula $$C_2B_{10}H_{12}$$

This being the case, then

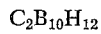

is the carboranyl radical and

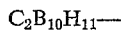

is the carboranylene radical. Carboranylacetylene has the formula

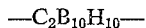

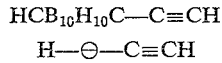

in which symbol —Θ— is the radical —$C_2B_{10}H_{10}$—. This nomenclature has been used throughout the specification and in the claims.

The compounds of the present invention are useful as components of propellant compositions, either as such or when further reacted to incorporate polymerizable groups into the molecule.

The parent substance of this group of compounds, namely carboranylacetylene, is prepared by reacting under anhydrous conditions bis(acetonitrile)decaborane, dissolved in dry acetonitrile, with a solution of diacetylene in acetonitrile. Prior to the addition of the diacetylene, the system is flushed with an inert gas, such as nitrogen, helium or argon, and the inert atmosphere is maintained in the reaction vessel during the addition of the diacetylene. The solution of bis(acetonitrile decaborane in acetonitrile is maintained at reflux during the addition, and the addition of approximately two moles of diacetylene to two moles of bis(acetonitrile)decaborane requires 45 to 60 minutes. The solution is then refluxed for 4 to 6 hours. The reaction mixture is then evaporated to a syrup, washed with aqueous sodium hydroxide solution, and extracted with several portions of a low boiling aliphatic hydrocarbon, such as pentane. After evaporation of the pentane solution to approximately one-half of its original volume, the crude pentane solution is passed through a bed of basic alumina to remove the colored impurities. This solution is concentrated to about one-tenth its original volume and the small amount of white solid impurity is removed by filtration. The filtrate es evaporated to dryness, yielding a waxy white solid, carboranylacetylene, which has a melting point of 60° to 70° C.

The ratio of diacetylene to bis(acetonitrile)decaborane (hereinafter referred to as "BAND") is not critical, and, although an excess of either reactant can be employed, an excess of BAND of the order of 25% can be employed without adversely affecting the nature of the reaction or the yield of the products. In general, a 1 to 1 or a 1 to 1.25 molar ratio of diacetylene to BAND is employed, since the excess BAND can be easily recovered.

It is not recommended that the refluxing period after addition of the diacetylene exceed 4 to 6 hours, since it is noted that a decrease in yield is obtained on prolonged heating.

The preparation of carboranylacetylene is the subject of a co-filed application, Serial No. 98,261, filed on even date herewith.

Other inert solvents, i.e., solvents which do not react with the reactants or the reaction products, can be used, but acetonitrile is the preferred solvent. As long as BAND or acetonitrile is present, however, other inert solvents such as benzene, toluene or xylene can be used.

The compounds of the present invention are compounds of the general formula

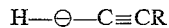

in which —Θ— is the radical —$C_2B_{10}H_{10}$— and R is selected from the group consisting of lower alkyl containing 1 to 4 carbon atoms, alkoxy containing 2 to 4 carbon atoms, hydroxyalkyl containing 1 to 3 carbon atoms, carboxyl, carbalkoxy containing 2 to 3 carbon atoms and halogen.

The derivatives of carboranylacetylene can be most conveniently prepared by reacting the carboranylacetylene with a Grignard reagent of the general formula $$RMgX$$

in which R is a lower alkyl and X is a halogen, to form a compound of the general formula

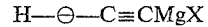

The Grignard complex will react readily with a variety of reagents to replace the —MgX group and produce the derivatives of carboranylacetylene which also form the subject of the present invention.

Typical of such reagents are (a) carbon dioxide to produce the corresponding propiolic acid which can subsequently be esterified, (b) ethylene oxide or propylene oxide to produce the corresponding 2-hydroxyethyl and 3-hydroxypropyl derivatives which can also be esterified, etherified, or nitrated, (c) iodine or bromine to produce the monoiodide or monobromide, (d) formaldehyde to form the hydroxymethyl derivative which can be esterified, etherified or nitrated, (e) acetaldehyde to produce the hydroxyethyl derivative which can be esterified, etherified or nitrated, and (f) alkyl halides and alkyl sulfates to form the monoalkyl derivatives.

Diacetylene, HC≡C—C≡CH, was prepared using the method of Armitage et al., J. Chem. Soc. 44 (1951), and this method of preparation is incorporated herein by reference. The method comprises the dehydrochlorination of 1,4-dichlorobutyne-2 with potassium hydroxide in dioxane solution.

Although there are numerous adducts of decaborane which will react with diacetylene to yield carboranylacetylene, the preferred adduct is the bis(acetonitrile) adduct, $B_{10}H_{12} \cdot (CH_3CN)_2$, commonly referred to as "BAND." This adduct can be prepared by the method of Schaeffer as set forth in J. Amer. Chem. Soc. 79, 1006 (1957) and this method of preparation is incorporated herein by reference.

Other adducts which can be employed are the dialkyl sulfide addition products of the general formula

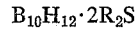

in which R is preferably methyl or ethyl.

The "acetylenic" hydrogen in carboranylacetylene is an "active" hydrogen, and readily forms the Grignard reagent by reaction of carboranylacetylene with an alkyl magnesium halide in an inert solvent. The alkyl group is generally lower alkyl and the halide is the bromide or iodide, with the bromide being preferred. Carboranylacetylene magnesium bromide behaves in the conventional manner, and reacts with a wide variety of compounds as set forth hereinbefore. Specific details of these reactions are given in the examples.

In preparing the Grignard of carboranylacetylene, the usual Grignard reaction conditions are employed. An inert anhydrous atmosphere is maintained in the reaction vessel and dry nitrogen, helium or argon can be employed. The preferred solvent is diethyl ether, but mixtures of diethyl ether with other inert solvents such as benzene toluene or xylene can be used.

Similar reaction conditions are used in the preparation of the derivatives of carboranylacetylene by the reaction of the other reactants with the carboranylacetylene Grignard complex. An inert anhydrous atmosphere is maintained and the reaction temperatures are in the range from 0° C. to 25° C. The rate of addition is not critical and is dependent only on temperature control. The theoretical molar ratio of carboranylacetylene Grignard to the other reactants is 1 to 1 and this is the ratio generally used. In some cases, particularly if the other reactant can be readily removed from the reaction mixture, an excess is used to insure as complete reaction as possible of the more difficulty obtainable carboranylacetylene Grignard. This excess is from 0.25 to 0.5 mole per mole of carboranylacetylene Grignard.

As set forth hereinbefore, carboranylacetylene and its derivatives are valuable as components of propellant compositions. A typical formulation is as follows.

| Component: | Percent by weight |
|---|---|
| Ammonium perchlorate | 70.0 |
| Carboranylmethylacetylene | 10.0 |
| Carboranyl methyl acrylate | 10.0 |
| TEGDN [1] | 10.0 |
| Benzoyl peroxide | 1.0 |

[1] TEGDN is triethylene glycol dinitrate.

This composition was cast into motor casings and cured for ten hours at 80° C. The physical properties were good and the case bonding was excellent. The specific impulse of this composition was high.

The following examples set forth certain well-defined embodiments of the application of this invention. They are not, however, to be considered as limitations thereof, since many modifications may be made without departing from the spirit and scope of this invention.

Unless otherwise specified, all parts are parts by weight. All temperatures are centigrade unless otherwise noted.

*Example I*

*Preparation of carboranyl acetylene.*—To a well-stirred, refluxing suspension of 375 grams (1.87 moles) of bis-(acetonitrile)decaborane, in 1.5 liters of dry acetonitrile, was added under nitrogen, a solution of 94.4 grams (1.89 moles) of diacetylene in 300 ml. of dry acetonitrile. The addition was carried out over a forty-five minute period after which the solution was refluxed for approximately four hours (the reaction solution was refluxed one hour after becoming homogeneous). The solution was stripped to a syrup using a rotary evaporator, treated with 500 cc. of 10% sodium hydroxide and extracted three times with 500–700 ml. portions of pentane. The combined pentane extracts were dried over anhydrous magnesium sulfate and concentrated to about one-half their original volume. This slightly yellow pentane solution was passed through a bed of basic alumina and the resulting colorless solution was concentrated to 200 ml. The white solid (biscarborane, 12 grams) which appeared was filtered off and washed with a small amount of pentane. The filtrate was evaporated to dryness yielding 110 grams (35%) of carboranylacetylene, a waxy solid of M.P. 63–70° C. Repeated recrystallization from pentane at −80° C. afforded a material of M.P. 75–78° C.

*Analysis.*—Calculated for $B_{10}H_{12}C_4$: B, 64.27; C, 28.54; H, 7.20. Found: B, 62.22; C, 28.70; H, 7.70.

*Example II*

*Preparation of 1-iodo-2-carboranylacetylene.*—To a stirred solution of 17.0 grams (0.1 mole) of carboranylacetylene in 100 ml. of anhydrous ether was added, under nitrogen, 100 ml. of 107 M of ethyl magnesium bromide (in ethyl ether) at such a rate as to maintain reflux. The solution of 25 grams (0.1 mole) of iodine in 250 ml. of ether was added dropwise tothe solution at 0° C. until a permanent iodine color persisted. After stirring for one-half hour, the reaction solution was poured into dilute hydrochloric acid and the ether layer separated. The aqueous layer was again extracted with ether, and the combined extracts were washed with water, dried over magnesium sulfate, and stripped to dryness. A slightly yellow solid was obtained which was dissolved in pentane and passed through neutral alumina. The resulting colorless solution was then stripped to dryness and 29.0 grams (98%) of 1-iodo-2-carboranylacetylene, a white solid was obtained. Recrystallization from pentane gave colorless needles, of 1-iodo-2-carboranylacetylene, M.P. 144–145° C.

*Analysis.*—Calculated for $B_{10}H_{11}C_4I$: B, 36.77; C, 16.33; H, 3.77; I, 43.13. Found: B, 36.81; C, 16.70; H, 4.26; I, 44.32

*Example III*

An equivalent quantity of bromine was substituted for the iodine of Example II. The corresponding bromocarboranylacetylene was recovered employing the same purification process.

*Example IV*

*Preparation of carboranyl propiolic acid.*—To a solution of 34.0 grams (0.2 mole) of carboranylacetylene in 300 ml. of anhydrous ether was adder dropwise under nitrogen 200 ml. of 1.0 M ethylmagnesium bromide solution at such a rate as to maintain moderate reflux. The solution was refluxed for thirty minutes and then cooled to −5° C. by means of a salt-ice bath. Dry carbon dioxide was bubbled through the stirred solution for one hour after which time the bath was removed and the bubbling continued for an additional three hours. During this time, a solid precipitated from the solution.

The reaction mixture was poured into cold dilute sulfuric acid and the ether layer separated. The aqueous layer was extracted twice with ether and the combined extracts were then dried over magnesium sulfate, filtered, and the ether removed. The resulting viscous orange liquid was dissolved in pentane and cooled to −80° C. The resulting solid was filtered and the filtrate was allowed to stand overnight at 0° C. An additional amount of solid was obtained. The combined solids were dissolved in carbon tetrachloride and the solution decolorized with activated charcoal. Removal of the solvent gave 22.0 grams of nearly white solid. Fractional crystallization of this material from carbon tetrachloride produced 9.0 grams (21%) of carboranyl propiolic acid, a crystalline white solid, M.P. 135–137° C. Further purification yielded a material of M.P. 138–139° C.

*Anaylsis.*—Calculated for $B_{10}H_{12}C_5O_2$: B, 50.95; C, 28.28; H, 5.70. Found: B, 50.36; C, 28.55; H, 6.03. Calculated equivalent weight 212.35. Found, 212.7.

*Example V*

*Preparation of methyl carboranyl propiolate.*—A solution of 4.7 grams of carboranyl propiolic acid (M.P. 137–139° C.) in 50 ml. of absolute methanol and 2 ml. of concentrated sulfuric acid was allowed to stir for six rays at ambient temperatures. The reaction solution was poured into ice water and extracted twice with ether. The combined ether extracts were washed with 10% sodium bicarbonate solution, dried over magnesium sulfate, filtered, and evaporated to dryness. Two and six-tenths grams (52%) of a white crystalline material was obtained. This was recrystallized from pentane yielding methyl carboranyl propiolate, M.P. 57–58° C.

*Analysis.*—Calculated for $B_{10}H_{14}C_6O_2$: B, 47.80; C, 31.83; H, 6.23. Found: B, 46.00; C, 32.53; H, 6.79.

Example VI

An equivalent quantity of butyl alcohol was substituted for the methanol of Example V. The corresponding butyl ester was recovered in good yield.

Example VII

*Preparation of 1-carboranyl - 1 - butyne-3-ol.*—To a stirred solution of 16.8 grams (0.10 mole) of carboranylacetylene 100 ml. of 0.98 M ethylmagnesium bromide solution was added at such a rate as to maintain moderate reflux. After stirring for thirty minutes at room temperature a solution of 5.0 grams (0.11 mole) of freshly distilled acetaldehyde in 50 ml. of ether was added dropwise over a ten-minute period. The solution was then refluxed for thirty minutes, cooled and poured into dilute hydrochloric acid. The ether layer was separated and the aqueous layer extracted once with ether. The combined extracts were then dried over magnesium sulfate, filtered and the ether removed. The resulting syrup was dissolved in carbon tetrachloride and passed through a column of silica gel. Upon removal of the solvent, 9.3 grams (44%) of a low melting crystalline solid was obtained. Two recrystallizations from pentane gave 1-carboranyl-1-butyne-3-ol, M.P. 78–79° C.

*Analysis.*—Calculated for $B_{10}H_{16}C_6O$: B, 50.94; C, 33.93; H, 7.59. Found: B, 51.24; C, 34.54; H, 8.03.

Example VIII

*Preparation of 1-carboranyl-1-propyne-3-ol.*—Into a 500 ml. round bottom flask equipped with a magnetic stirrer, a gas inlet tube, a condenser, which was previously flushed with dry nitrogen, was placed 200 ml. (0.1 mole) of 0.05 M ethereal solution of carboranyl acetylene magnesium bromide solution. An excess of formaldehyde gas, prepared by heating paraformaldehyde, was passed into this solution at room temperature. Upon first passing the formaldehyde into the Grignard solution a solid was formed. However, this redissolved upon further treatment with formaldehyde.

The reaction mixture was poured, with stirring into 500 ml. of dilute sulfuric acid (6 N). The ether layer was separated and the aqueous solution was extracted with additional ether. The other extracts were combined, dried over anhydrous magnesium sulfate, and filtered. The ether was removed under vacuum producing 7.0 g. of a viscous, slightly brown colored syrup. This was dissolved in hexane and the solution allowed to stand in a refrigerator overnight. A white crystalline solid of M.P. 87–88° C. was obtained. The infrared spectrum of the material revealed a strong absorption in the —OH region.

*Analysis.*—Calculated for $B_{10}C_4H_{14}O$: B, 54.25; C, 30.27; H, 7.11. Found: B, 52.99; C, 30.89; H, 7.44.

Example IX

*Preparation of 1-carboranyl prop-1-yne.*—Into a 1-l. 3-necked round bottom flask equipped with a mechanical stirrer, a reflux condenser, and a dropping funnel was placed a solution of 30.0 g. (0.180 mole) of carboranyl acetylene in 200 ml. of anhydrous diethyl ether. To this solution was added, dropwise under dry nitrogen 200 ml. (0.181 mole) of 0.91 M ethereal ethyl magnesium bromide solution. The addition was carried out over a fifteen minute period after which the solution was allowed to stir for approximately one-half hour.

To the solution was added dropwise a solution of 50 g. (0.385 mole) of dimethyl sulfate in 100 ml. of ether. After stirring overnight the reaction mixture was poured with stirring into approximately 300 ml. of 1 N sulfuric acid. The resulting ether layer was separated and the aqueous portion extracted with additional ether. The combined ether extracts were dried over anhydrous $MgSO_4$ and filtered. The ether was removed producing a slightly damp white solid. This solid was dissolved in pentane and the resulting solution filtered through a bed of acid aluminum. The solution was concentrated until precipitation of a solid started, whereupon it was allowed to stand in a refrigerator overnight. 2.8 g. of a white solid was obtained of M.P. 104–107° C. The filtrate was cooled in a Dry Ice-acetone bath (approximately −80° C.) producing 19.0 g. of a white solid of M.P. 74–78° C. The infrared spectrum of this material revealed no acetylenic hydrogen absorption. The overall spectrum was consistent with that expected for a compound 1-carboranyl prop-1-yne.

Example X

Using the process of Example IX, a molar equivalent of butyl bromide was substituted for dimethyl sulfate. The corresponding butyl derivative was obtained in good yield.

We claim:

1. Compounds of the general formula $$HC_2H_{10}B_{10}C\equiv CR$$

in which R is selected from the group consisting of alkyl of 1 to 4 carbon atoms, halogen, carboxyl and hydroxyalkyl containing 1 to 3 carbon atoms.

2. Carboranyl propiolic acid of the formula $$HC_2B_{10}H_{10}-C\equiv C-COOH$$

3. 1-carboranyl-1-propyne-3-ol of the formula $$HC_2B_{10}H_{10}-C\equiv C-CH_2OH$$

4. 1-carboranyl-1-butyne-3-ol of the formula $$HC_2B_{10}H_{10}-C\equiv C-CH(OH)-CH_3$$

5. 1-bromo-2-carboranylacetylene of the formula $$HC_2B_{10}H_{10}-C\equiv CBr$$

6. 1-carboranyl-1-butyne-4-ol of the formula $$HC_2B_{10}H_{10}-C\equiv C-CH_2CH_2OH$$

7. Carboranylmethylacetylene of the formula $$HC_2B_{10}H_{10}C\equiv CCH_3$$

References Cited by the Examiner

UNITED STATES PATENTS 3,158,656  11/1964  Alexander et al. ____ 260—606.5
3,167,584  1/1965  Ager et al. _____ 260—537

OTHER REFERENCES

Gillman: Organic Chemistry, John Wiley & Sons, Inc., vol. 1, 2nd edition (1943), pp. 496, 500, 505, 506, 509 and 512.

LORRAINE A. WEINBERGER, *Primary Examiner.*

LEON D. ROSDOL, ROGER L. CAMPBELL, CARL D. QUARFORTH, *Examiners.*

J. W. WHISLER, L. A. SEBASTIAN, I. R. PELLMAN, *Assistant Examiners.*